… … …

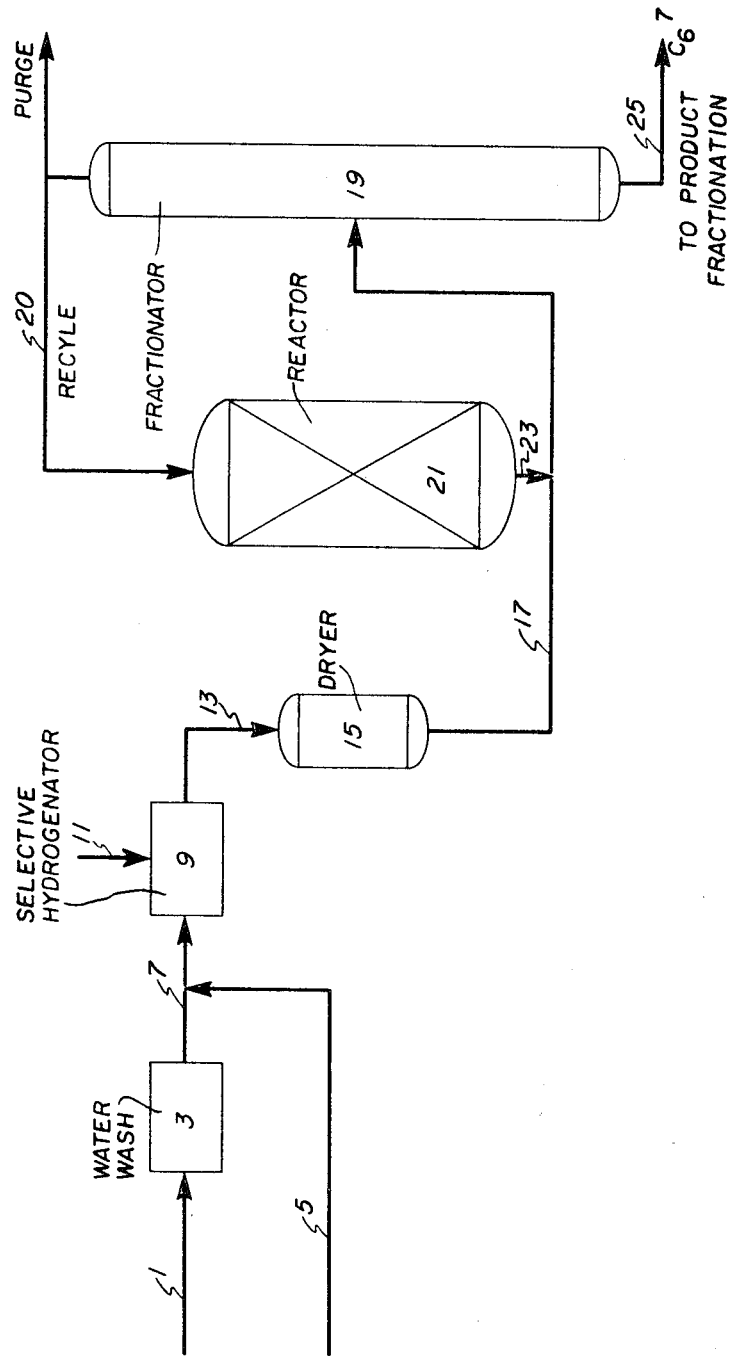

United States Patent Office 3,649,710
Patented Mar. 14, 1972

3,649,710
FEED PRETREATMENT PROCESS
Arthur H. Neal, P.O. Box 4255, Baytown, Tex. 77520;
Raymond C. Lohman, 11 Sherwood Drive, Huntington,
N.Y. 11743; and Lloyd A. Pine, Baton Rouge, La.
(Koppersvagen 32, Stenungsund, Sweden)
Filed Nov. 24, 1969, Ser. No. 879,374
Int. Cl. C07c 3/20
U.S. Cl. 260—683.15 R                 5 Claims

ABSTRACT OF THE DISCLOSURE

In those processes which employ nickel oxide catalysts in the polymerization and copolymerization of olefins, especially those containing up to about 6 carbon atoms, a particular combination of treating steps for pretreating the feed is necessary to provide good conversion and maintain a long life for the catalyst. These steps include water washing, selective hydrogenation and distillation of the feed prior to passing it to the polymerization reactor. By employing such a combination of steps, the various types of nickel oxide catalyst poisons contained in the butene and propylene feed are removed.

---

This invention relates to improvements in the polymerizing or copolymerizing of olefins which employ nickel oxide catalysts. In one aspect this invention relates to a feed clean-up procedure to remove the catalyst poisons therefrom whereby conversion, selectivity and long catalyst life are maintained.

Cracked mineral oils provide a source of mixed butenes and propylene feedstock employed in the nickel oxide process for the dimerization and codimerization of olefins. The butene fraction consists essentially of n-butenes, isobutylene, 1,3-butadiene, butane and, in addition, small quantities of vinyl acetylene, ethyl acetylene and dimethylacetylene as well as small quantities of other hydrocarbons including 1,2-butadiene. The propylene fraction contains in addition to gaseous hydrocarbon small quantities of acetylene, methylacetylene and allene.

Tertiary butyl alcohol, as well as some heavier oxygenated compounds, are introduced into the butene stream after it has been treated with sulfuric acid in order to remove the isobutylene therefrom.

As stated hereinabove, these feed streams are utilized in those processes which employ nickel oxide catalysts in the dimerization and codimerization of olefins. For example, there is described in a copending and now abandoned application bearing Ser. No. 661,225, filed Aug. 7, 1967, in the names of Lloyd A. Pine and Joseph K. Mertzweiller, a new and improved process for the copolymerization of propylene and n-butylene at low temperatures in liquid phase to yield predominantly straight chain or singly branched $C_6$, $C_7$ and $C_8$ olefins. This reaction is kinetically controlled and the reaction product mixtures are rich in heptenes and contain relatively small amounts of olefins greater than $C_8$.

While this process has proved highly satisfactory, it has nonetheless been found that the life of the catalyst is greatly shortened by the use of feed streams containing the impurities enumerated hereinabove. The acetylenes and diolefins are in some manner physically adsorbed by the catalyst and greatly decrease the activity of the catalyst and also its selectivity. Eventually, catalyst activity becomes so low that the operation must be shut down and the undesirability of such interruptions is quite clear despite the obvious commercial advantages of using the impure streams.

One object of the present invention is to provide a feed clean-up procedure which prolongs the catalyst life in the dimerization and codimerization of butenes and propylenes over a nickel oxide catalyst;

Another object of the present invention is to provide a simple and unique process for overcoming the adverse effects of acetylene, diolefin, tertiary butyl alcohol and heavy oxygenated compounds which are present as impurities in a cracked mineral oil butene-propylene feed stream;

Yet another object of this invention is to provide a treating procedure for purifying a steam cracked butene and propylene feed in order to retain good conversion per pass and satisfactory catalyst life in the codimerization of butene and propylene to n-heptene;

Other objects and many of the attendant advantages of this invention will be readily appreciated as the same becomes better understood by reference to the following detailed description which is to be considered in connection with the accompanying drawing wherein:

The sole figure in the case represents a flow diagram showing the various aspects of the subject invention.

Briefly, this invention comprises a feed pretreatment process for cleaning up butene and propylene fractions which have been formed in the pyrolysis of crude petroleum oils, said process comprising the steps of first water washing the butene fraction; combining the butene fraction with the propylene fraction to form a feedstream for a codimerization reaction; selectively hydrogenating the feedstream containing n-butenes and propylene fractions; fractionating the hydrogenated feedstream to form an overhead stream and a bottoms stream, said bottoms stream containing heavy oxygenated compounds; and passing the overhead to a reactor containing a nickel oxide catalyst whereby the reactivity and the life of the nickel oxide catalyst is substantially improved during the codimerization of said butene and propylene to heptene.

With reference to the drawing, a typical refinery butene stream, from which the butadiene and isobutylene have been extracted, is introduced via line 1 into a washing zone 3 wherein it is water washed.

The washing of the feed is carried out in a countercurrent extractor or tower at a temperature ranging from 60–80° F., preferably 65 to 75° F. at sufficient pressure to keep butenes in liquid phase with about 0.5 to 2 pounds water to olefin ratio.

The propylene fraction from the steam cracked crude petroleum mineral oil is passed via line 5 and combined with the water washed butene stream in line 7.

The combined fraction is passed into hydrogenation zone 9. Hydrogen is introduced via line 11 into zone 9.

It is of great importance that the throughput of crude material through the catalyst chamber should be high. With hydrocarbon fractions which contain acetylene, methylacetylene and allene in proportions which are each below 2% by weight and usually each below 1% by weight, it is advisable to use throughputs of 1 to 40 kilograms, and preferably 2 to 20 kilograms, of hydrocarbon fractions per liter of catalyst volume per hour. When the raw material has particularly high contents of acetylene, methylacetylene and allene, it is frequently advantageous for some of the reaction products to be returned into the hydrogenation system in order to lower the concentration of the said impurities at the inlet end of the system and thus to counteract a local rise in the temperature caused by the heat of hydrogenation.

Fixed bed catalysts are used in the reaction chamber. Examples of hydrogenation components in the catalyst are the precious metals of the Group VIII of the Periodic System of the elements and primarily palladium and platinum, which are applied in quantities of from about 0.1 to 5% and advantageously from 0.5 to 3%, to a support which may for example consist of active aluminum oxide gel, silica gel or active carbon. Natural silicates, such as an aluminum silicate or magnesium silicate, are of course also suitable for use as supports for the precious metals. Especially suitable are those supports which have an internal surface of less than approximately 50 square meters per gram and a water adsorption capacity of at least 10%. It is particularly advantageous to use the supports which have a water-adsorption capacity of 20% or more and an internal surface of less than 20 square meters per gram.

The conditions of hydrogenation include temperatures of from about 50 to 500° F., while temperatures in the range of about 100 to 400° F. are preferred. Operating pressures may often range from atmospheric to about 3,000 p.s.i.g. with about 100 to 2,000 p.s.i.g. being preferred. In a continuous reaction the catalyst concentration is best defined by weight hourly space velocity (WHSV), that is to say the weight of feed processed per weight of catalyst per hour. A weight hourly space velocity of about 0.1 to 100 can be used with preferred WHSV being about 0.1 to 10. The reaction conditions are usually chosen to effect at least about 50% hydrogenation of the diolefinic and acetylenic impurities in the mixture, and preferably sufficient to effect greater than about 75% hydrogenation thereof. Generally a ratio of about 0.2 to 20 moles of molecular hydrogen per mole of diolefinic plus acetylenic impurities will effect the desired degree of hydrogenation with about 0.4 to 10 moles being preferred. Either a liquid or vapor phase reaction can be employed, but the liquid phase reaction is preferred.

The hydrogenated feedstream is passed via line 13 from the selective hydrogenation zone through drying zone 15.

The feedstream then is passed from the drying zone 15 via line 17 to a fractionation column 19 wherein the n-butene and propylene feed is separated from any heavy oxygenated compounds contained therein. The overhead is maintained at a temperature ranging from 58–65° F.

The propylene-butene feedstream overhead is passed via line 20 into the reaction zone 21. The reaction product mixture is passed via line 23 and combined with the feed in line 17. The C$_6$+ product is removed from the bottom of column 19 via line 25.

In the particularly preferred proplyene and butene codimerization reaction, several operating variables are important. The molar ratios of C$_4$ to C$_3$ olefins in the feed are an important operating variable and greatly influence the selectivity of the reaction system to produce heptenes, especially lightly branched C$_6$, C$_7$ and C$_8$ olefins generally. Under the normal conditions of operation the molar ratio of C$_4$ to C$_3$ olefins ranges from about 1:1 to about 5:1 and preferably from about 2:1 to about 3.5:1. The optimum even in this particular system cannot be precisely defined inasmuch as it is influenced to some extent by other operating conditions.

The preferred codimerization catalyst is nickel oxide supported on silica gel, silica alumina or other such suitable carrier. Nickel oxide can exist as nickel oxide, nickel dioxide, nickel sesquioxide, nickel peroxide or mixtures of these and other oxides. In most instances nickel oxide is predominant in such mixtures.

The silica gel can be used alone or with a catalyst promoter such as alumina and can be prepared by any of several known methods. Suitably, the carrier is impregnated with from about 0.1% to about 35% and preferably from about 15% to about 30% of nickel oxide or mixtures of oxides based on a total weight of the resultant catalyst. An amorphous silica gel containing from 10% to about 45%, preferably from about 15 to about 25% alumina based on the total weight of the gel is found to be a highly effective support.

The catalyst is activated by calcining in an oxygen containing atmosphere at a temperature ranging from 800–1,200° F.

Olefinic conversion is found to be a function of space velocity. For practical reasons, an olefin feed rate of about 1–10 volumes of olefin per volume of catalyst per hour, and preferably from about 2–5 volumes of olefin per volume of catalyst per hour, is employed in the reaction.

The process is operable over a wide range of conditions. In general, temperatures range from 175 to about 250° F., and pressures from about 30 to 50 atmospheres.

The following examples demonstrate the effectiveness of our clean-up procedure:

FEEDSTOCK COMPOSITIONS

| Feed Sample | A | B | C | D |
|---|---|---|---|---|
| Composition, wt. percent: | | | | |
| Propane | 0.11 | 0.11 | 0.18 | 0.10 |
| Propylene | 0.52 | 0.35 | 0.52 | 0.21 |
| Isobutane | 2.77 | 1.52 | 2.11 | 1.55 |
| n-Butane | 3.18 | 3.09 | 7.42 | 7.08 |
| Butene-1 | 53.48 | 51.84 | 14.61 | 14.79 |
| Isobutene | 1.70 | 1.70 | 1.15 | 1.21 |
| Trans butene-2 | 21.20 | 21.56 | 45.29 | 48.00 |
| Cis butene-2 | 14.71 | 15.61 | 25.88 | 27.02 |
| Butadiene | 2.11 | 2.11 | 0 | 0 |
| C$_5$ | 0.18 | 1.32 | 0.80 | 0.04 |
| C$_6$+ | | | 2.00 | 0 |
| Tert-butyl alcohol, p.p.m. | 1,450 | <30 | <30 | <30 |
| Heavy oxygenated compounds, est. p.p.m. | | | 125 | 0 |

EXAMPLE I

Feedstock A, a steam cracked butene stream from which the butadiene and isobutylene had been previously extracted, was water washed in a continuous 20-stage countercurrent extractor at ambient temperature and at 70–75 p.s.i.g. with about 0.8 lb. of water per lb. of butene. This reduced the tertiary butyl alcohol content from 1,450 to <30 p.p.m. with no other significant change to produce Feedstock B.

Feedstock B was then hydrofined over a palladium catalyst (0.6% palladium on alumina) at 500 p.s.i.g. and at a temperature ranging from 200–210° F. at a rate of 5–6 WHSV and a 4/1 mol ratio of hydrogen to butadiene. After this hydrofining step, the butadiene content was reduced from 2.11% to <10 p.p.m. All traces of acetylenes and other diolefins were removed and this then became Feedstock C.

As a control a pure butene stream along with isobutane (as an inert diluent) was fed over a nickel oxide supported on silica alumina catalyst and a hydrofined propylene stream was fed at 500 p.s.i.g., a temperature of 210° F., a feed rate of 4.3 volumes of olefin/hr./volume of catalyst to the reactor. An overall olefin conversion of 26% was obtained.

While lined out at these conditions, the feedstock was switched and the butene portion of the feedstock designated as Feedstock C was substituted for the purified butene stream used in the earlier period. Within 24 hours the conversion had dropped to 14% as the catalyst was rapidly deactivated. This conversion level and rate of catalyst deactivation were completely unsatisfactory for the nickel oxide process.

EXAMPLE II

The feedstock designated as C above, which gave severe catalyst deactivation, was distilled in a packed column at an overhead temperature of 58–65° F. so that the bottoms fraction contained from 2.5–5% by weight of the feed. The bottoms fraction consisted largely of C$_5$–C$_8$ hydrocarbons and also oxygenated compounds estimated to be about 125 p.p.m. on the original butene feed. This feedstock designated as D hereinabove was used in the following run.

In a continuous pilot plant, over a nickel oxide on silica alumina catalyst was fed a mixture of the purified propylene and a purified butene stream previously shown to have no catalyst poisons. Lined out conditions were established at 190 F. and an olefin feed rate of 4.1 volumes of olefin per hour per volume of catalyst. A conversion level of 33% was established. The purified butene feed was then withdrawn and Feedstock D, the distilled steam cracked butene feed, was substituted under the same process conditions. There was no change in the conversion level or in the quality of the product and the run was continued at constant temperature with very little deactivation for 13 days. At this point the temperature was increased slightly to make up for the inherent catalyst deactivation and the run continued with the same feedstock under the same process conditions for another 8 days. Altogether in this run, steam cracked butenes prepared in the manner specified in this invention were fed for 29 days during a single reaction cycle. This is extremely satisfactory and perfectly adequate for commercial operations.

These examples demonstrate the criticality of the processing technique set forth hereinabove in that the hydrofining and distillation step are both required in order to produce an acceptable butene feed free of catalyst poisons.

In one particular alternate, the water washing step can be omitted as the tertiary butyl alcohol can be rejected along with the heavy oxygenated compounds in the distillation step. This can be done if the concentration of tertiary butyl alcohol is not too great.

What is claimed is:

1. In a codimerization reaction wherein propylene and n-butenes are codimerized over a supported nickel oxide catalyst to form a reaction product mixture comprising $C_6+$ olefins, a process for pretreating the propylene and n-butene prior to their being contacted with said nickel oxide supported catalyst whereby the catalyst life and selectivity are prolonged, said pretreating process comprising the steps of first water-washing the n-butenes to remove tertiary butyl alcohol present with said n-butenes, selectively hydrogenating a feed stream comprising propylene, n-butene, acetylenes, diolefins and heavy oxygenated compounds whereby said acetylenes and diolefins are hydrogenated to form monoolefins and saturated compounds; fractionating the hydrogenated feedstream to form a bottoms stream containing the heavy oxygenated compounds and an overhead stream containing n-butenes and propylene, and feeding the overhead stream from said fractionation to a reaction zone containing said supported nickel oxide catalyst.

2. A process according to claim 1 further including the step of drying the hydrogenated feedstream prior to the step of fractionating the steam.

3. A process according to claim 1 wherein the washing is conducted at a temperature ranging from 65 to 75° F.

4. A process according to claim 1 wherein said selective hydrogenating step is conducted over a catalyst comprising 0.6% palladium supported on alumina.

5. A process according to claim 1 further including the steps of combining said reaction product mixture with said hydrogenated feedstream prior to the fractionating step and recycling the unreacted $C_4$ and $C_3$ in the overhead stream.

References Cited

UNITED STATES PATENTS

| | | | |
|---|---|---|---|
| 3,518,323 | 6/1970 | Pine et al. | 260—683.15 |
| 3,312,745 | 4/1967 | Habeshan et al. | 260—683.15 X |
| 3,412,169 | 11/1968 | Clark | 260—677 |
| 3,485,887 | 12/1969 | Kronig et al. | 260—677 |

FOREIGN PATENTS

| | | | |
|---|---|---|---|
| 1,155,125 | 6/1969 | Great Britain | 260—683.15 |

PAUL M. COUGHLAN, JR., Primary Examiner

U.S. Cl. X.R.

260—677 H